Patented Feb. 2, 1932

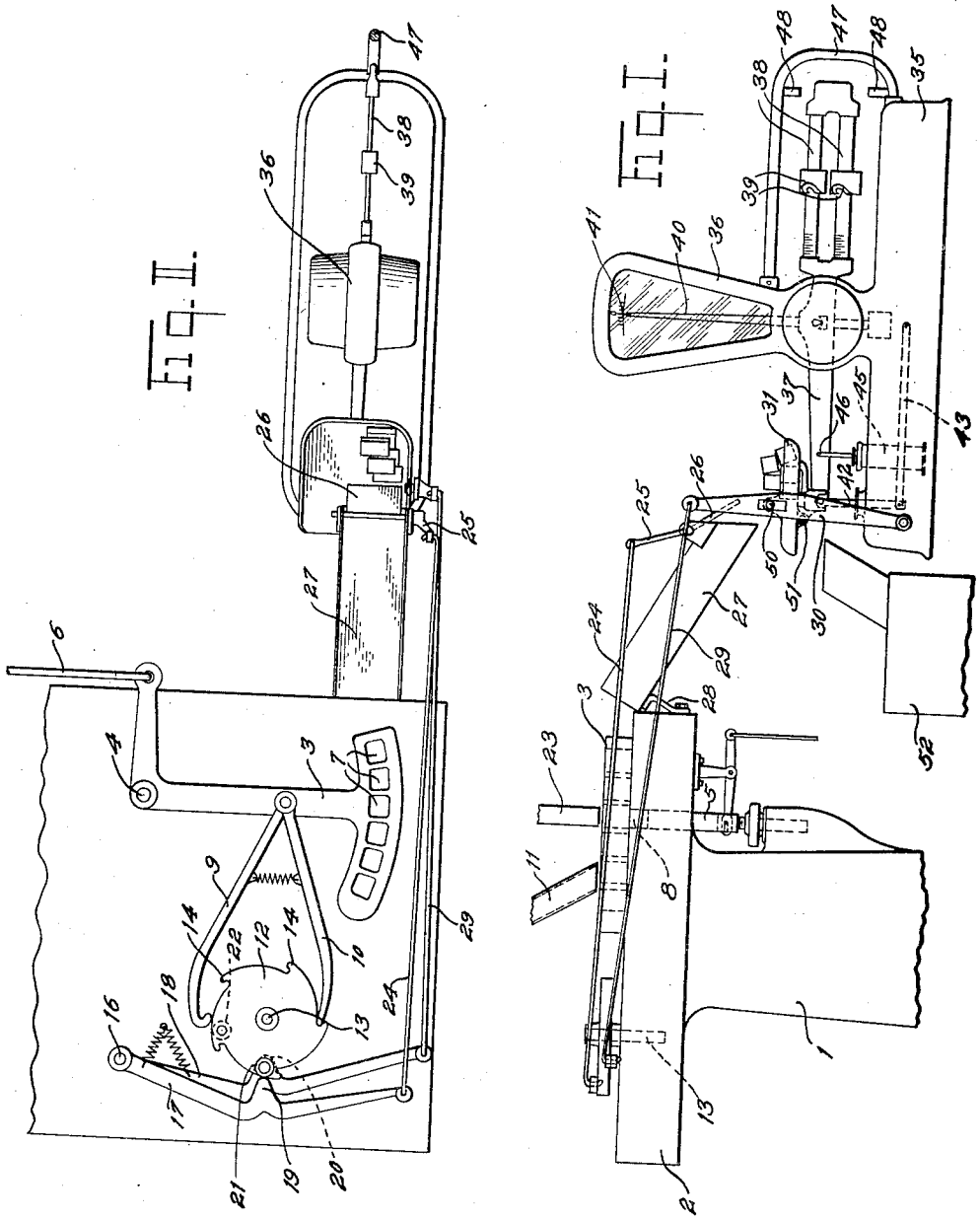

1,843,156

UNITED STATES PATENT OFFICE

HALVOR O. HEM, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed January 27, 1926. Serial No. 84,024.

This invention relates to weighing scales, and more particularly to those of the type known as predetermined weight scales.

In the fabrication of certain articles of manufacture, as, for example, carbon brushes used in electrical work, canned goods and other articles or commodities which are of substantially uniform weight, it is desirable for the manufacturer to accurately ascertain the weight of the articles, as the manufacture of overweighted articles, if continued for any length of time, would result in serious losses, and particularly so if the finished commodities are comparatively small in size and the material from which they are constructed is comparatively expensive.

It is one of the principal objects of this invention to provide a means for accurately and simultaneously weighing a plurality of finished articles in order that any comparatively slight discrepancy or variation in the weight of the individual articles will be prominently indicated and proper adjustments made to correct the variation.

Another object of the invention is the provision of a device for checking the weight of articles as they are automatically delivered to and removed from the scale platform.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of the device of my invention;

Figure II is a top plan view of the mechanism illustrated in Figure I.

Referring to the drawings in detail, I have shown my invention in conjunction with a machine which is used for compressing granulated carbon into substantially cube-shaped bodies termed brushes of the type used in electric motors and current generators. As the portion of the machine illustrated does not form a part per se of my invention, I will not describe it in further detail than to show the connection of my invention therewith.

The machine consists of a standard 1 supporting at its upper end a table 2 upon which is mounted a bell crank 3 adapted for pivotal movement about a pintle 4. The arm 3 is operated from mechanism of the brush fabricating machine (not shown) by means of a link 6, the arm 3 being provided with a T-shaped portion having a plurality of openings or pockets 7. In operation the arm 3 is adapted to be oscillated by means of the link 6 about the pintle 4, thus bringing the openings 7 into successive registration with an aperture 8 in the table 2. Pivoted to the arm 3 is a pair of pawls 9 and 10, the extremities of which are adapted to engage the irregular periphery of a ratchet wheel 12 pivoted to a vertical stud shaft 13 journaled for rotation in a bore in the table 2 of the machine. The ratchet wheel 12 is provided with a plurality of teeth 14 which are adapted to be successively engaged by the pawls 9 and 10 to rotate the wheel 12 for a purpose to be hereinafter described, the number of teeth on the wheel 12 corresponding to the number of articles to be weighed at one time. Pivoted upon a stud shaft 16 is a pair of arms 17 and 18 provided with projections or cam surfaces 19 and 20 which are adapted to be engaged by rollers 21 and 22 revolubly supported upon the ratchet wheel 12. The extremity of the arm 17 is connected by means of a rod or cable 24 to the operating handle 25 of a hinged closure 26 which is positioned in the extremity of an inclined chute 27 secured to the table 2 by means of a bracket 28. The extremity of the arm 18 is connected by means of a rod or cable 29 to a lever 30 which is so connected to the scale platform 31 as to tip the latter in a manner to be hereinafter more fully explained.

The weighing scale per se consists of a base 35 upon which is erected intermediate its ends an upright housing 36. Fulcrumed within the housing 36 is a pendulated lever 37, one end of the lever supporting the platform or article receiver 31, the other end of the lever being provided with a pair of beams 38 which slidably support poises 39 for normally offsetting the major part of the load upon the platform 31. Rigidly secured to the lever 37 and projecting upwardly into the housing is an indicating arm 40 adapted to co-operate with a suitably graduated chart 41. The article receiver 31 is provided with a depending stem 42 which is pivotally connected at its lower end to one end of a horizontal link 43, the other end of the link being pivotally connected to the base 35, the link serving to maintain the article receiver or platform 31 level throughout weighing movements. The oscillations of the lever 37 occurring during weighing operations are dampened by means of a dash pot 45 which is connected to the lever 37 at 46. A guard 47 surrounds the beams 38 to prevent accidental injury thereto, the guard also carrying stop members 48 to limit the movement of the lever.

In the operation of the mechanism it is to be understood that the machine for compressing granulated carbon into brushes (a portion of which is illustrated) is only illustrative of one particular use to which my invention may be applicable. The granulated carbon or graphite powder is permitted to pass through a chute 11 into the pockets or openings 7 in the arm 3. A counter-clockwise rotation of the arm 3 moving the pockets 7 into successive registration with the opening 8 in the table causes the opening to become filled with carbon. The arm 3 is then rotated in a clockwise direction, thus moving it clear of the opening 8, such movement causing the extremity of the pawl 10 to engage a tooth on the ratchet wheel 12, rotating the wheel through substantially one-tenth of a complete revolution. When the arm 3 is swung clear of the opening 8 the plunger 23 is depressed by means of mechanism (not shown) into the opening 8 and compresses the granulated carbon into a block or cube. The plunger 5 forming the extruding member of the die is vertically adjustable so that the depth of the opening 8 in the surface of the table may be varied. Immediately after the withdrawing of the compressing plunger 23 the plunger 5 is caused to move upwardly, extruding the finished brush to the surface of the table 2. During these successive operations the arm 3 has reached its maximum clockwise movement and reversed its direction of movement. The flat faced end of the T-shaped portion of the arm 3 engages the finished brush and moves it into the chute 27. The closure 26 obstructing the lower end of the chute prevents further movement of the brush. This counter-clockwise movement of the arm 3 causes the hook-like extremity of the pawl 9 to engage one of the teeth of the ratchet wheel 12 and move the latter through one-tenth of a revolution. It will therefore be apparent that with the completion of each brush the ratchet wheel 12 has moved through one-fifth of a revolution. After five brushes have been formed the wheel 12 has been moved through one complete revolution, at which point the roller 21 engages the projection 19 of the arm 17 to actuate the closure 26 in the chute 27 and permit the discharge of the five finished brushes into the scale pan or article receiver 31. By noting the position of the indicator hand 40 relative to the chart 41 the relation that the weight of the five brushes bears to a predetermined weight may be readily ascertained. By way of example, the poises 39 are first moved to a position such that the weight of five brushes of the predetermined correct weight brings the indicator 40 into registration with the zero or central mark on the chart 41. If the average weight of a set of five brushes to be tested is less than the predetermined standard the indicator will move to the right. If the average weight is too large the indicator will move to the left. The position of the plunger 5 in the machine table 2 may then be adjusted to vary the size of the opening 8 so as to increase or decrease the amount of carbon in each brush, which results in an increase or decrease in the weight of the finished brushes. Whenever the plunger 5 is adjusted, the plunger 23 is also adjusted by mechanism (not shown) so that the finished size of the brush never varies, but the amount of granulated carbon in each brush is varied whereby the density of the brush is changed.

It is very often necessary to vary the density of a carbon brush in order that the internal resistance of the brush to the passage of an electric current may remain constant. The variations in resistance in brushes are due to the variations in size, shape and resistance of the minute particles of carbon and also the amount of pressure that is exerted upon the carbon particles in forming a brush. It is, therefore, apparent the resistance of a brush varies inversely with the density and that by varying the number of particles of carbon in a brush of a given size the weight thereof will be changed, as well as the internal resistance. Thus it is possible to form a number of brushes of a given size having a predetermined degree of resistance, by simply making them conform to a predetermined standard weight.

The brushes remain in the pan 31 until five more brushes are formed and discharged into the chute 27, during which time the ratchet wheel 12 has been moved in a clockwise direction to a position in which the roller 22 engages the projection 20 on the arm 18, thus actuating the latter to move the lever 30 through the medium of the cable 29. The lever 30 is provided with a slot which loosely receives a pin 50 carried by the scale platform 31, so that movement of the lever 30 will cause the platform to be tipped about a pintle 51 carried by the platform supporting spider, thus discharging the brushes into a receptacle or container 52.

The foregoing described operations are entirely automatic in their action and continue in proper sequence as long as the brush forming machine is in operation. With the device of this invention it is possible for the operator to keep a close check upon the weight of each successive set of brushes.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism including an article receiver, a chute arranged above said article receiver, means for discharging a predetermined number of articles from said chute into the article receiver, and means operating independently of said weighing mechanism for tipping said article receiver to discharge said articles therefrom.

2. In a device of the class described, in combination, weighing mechanism including an article receiver, a chute positioned above and independently of said article receiver, a closure for said chute, means for discharging articles into said chute, means for operating said closure to effect a discharge of said articles into the article receiver, and means for automatically discharging said articles after a predetermined length of time.

3. In a device of the class described, in combination, a frame, a lever supported upon the frame, load-counterbalancing and indicating means connected to said lever mechanism, an article receiver supported upon the lever, means for discharging a predetermined number of articles into said article receiver, and means for tipping the article receiver to discharge said articles therefrom after the completion of a weighing operation.

4. In a device of the class described, in combination, a frame, a lever supported upon the frame, manually operated load-counterbalancing mechanism connected to one end of said lever, a spider supported upon the other end of said lever, an article receiver pivotally supported upon said spider, and means for periodically tipping said article receiver to discharge articles therefrom.

5. In a device of the class described, in combination, a frame, a lever supported upon the frame, load-counterbalancing and indicating mechanism connected to said lever, a spider supported upon said lever, an article receiver pivotally supported upon said spider, means for automatically discharging a predetermined number of articles into said article receiver, and means for tipping said article receiver to discharge said articles therefrom after a completed weighing operation.

6. In a device of the class described, in combination, weighing mechanism including an article receiver, means for successively delivering predetermined counts of articles to said article receiver, means for indicating the relation that the weight of each lot of articles bears to a predetermined standard, and means for subsequently discharging each successive lot of articles from said article receiver.

7. In a device of the class described, in combination, weighing mechanism comprising a frame, a lever supported upon the frame indicating means and load-counterbalancing mechanism connected to said lever, a commodity-receiver supported upon said lever, and automatic means operating independently of said weighing mechanism adapted for tipping said commodity-receiver to discharge articles after the weighing operation has been completed.

HALVOR O. HEM.